3,217,022
PRODUCTION OF FERROCENE COMPOUNDS
Hans Cordes, Ludwigshafen (Rhine), Germany, assignor to Badische Anilin- & Soda-Fabrik Aktiengesellschaft, Ludwigshafen (Rhine), Germany
No Drawing. Filed Dec. 10, 1962, Ser. No. 243,592
Claims priority, application Germany, Dec. 15, 1961, B 65,200
12 Claims. (Cl. 260—439)

This invention relates to a process for the production of ferrocene compounds, especially the production of ferrocene (dicyclopentadienyliron) and its alkyl-substituted derivatives from ferric chloride, iron and cyclopentadiene or alkyl-substituted cyclopentadienes. Many methods for the production of ferrocene are known from the literature. For example, gaseous cyclopentadiene has been reacted with iron oxyde or freshly reduced iron at elevated temperature. According to another known process, cyclopentadiene has been reacted with iron carbonyls at standard pressure or under increased pressure in autoclaves. It is also known to prepare ferrocene by reaction between iron salts and organometallic derivatives of cyclopentadiene, for example ferrous chloride and cyclopentadienylsodium. Instead of cyclopentadienylsodium, cyclopentadiene itself has already been reacted in the presence of bases such as amines or alkali metal alcoholates. In this method, the ferrous chloride is first prepared from ferric chloride by reduction with elementary iron in tetrahydrofurane. The quality of the iron powder used in this process must satisfy special requirements. In practice, only a very finely divided powder having a grain size of less than 10 microns can be used. In spite of this, relatively long reduction periods are necessary. The reaction of the ferrous chloride (which is insoluble in tetrahydrofurane) with cyclopentadiene takes place in a second reaction step in the presence of a base, as for example diethylamine or sodium ethylate and/or completion requires several hours. In order to obtain good yields, the concentration of the base must be as high as possible. It is therefore necessary to distill off the relatively large amounts of tetrahydrofurane as completely as possible in a complicated process prior to adding the base.

I have now found that the disadvantages of the prior art methods are avoided and ferrocene compounds are obtained from ferric chloride, iron and cyclopentadiene on a commercial scale by reducing ferric chloride with iron in an organic solvent in which both ferrous chloride and ferric chloride are soluble, reacting the solution thus obtained with a strong base, preferably an alcoholate of an alkali metal or diethylamine, introducing cyclopentadiene or an alkyl-substituted cyclopentadiene into the reaction mixture and separating the ferrocene compound from the resultant reaction mixture either by means of aqueous mineral acid or, after removal of the volatile solvent and base, from the residue by sublimation, recrystalization or steam distillation.

The term "ferrocene compounds" as used herein is intended to include ferrocene itself and alkyl-substituted derivatives thereof in which the alkyl substituent has from 1 to 4 carbon atoms. Suitable starting materials besides cyclopentadiene include methylcyclopentadiene, ethylcyclopentadiene, n - propylcyclopentadiene, i - propylcyclopentadiene and n-butylcyclopentadiene.

No special requirements as to quality are placed on the ferric chloride and iron used for the reduction. For example, technical ferric chloride and commercially available technical iron powder may be used. Reduction may also be carried out with scrap iron, for example turnings.

Organic solvents in which at least 1% by weight and preferably at least 10% by weight of ferric chloride and also ferrous chloride, with reference to the total weight of the solution, can be dissolved, are suitable for the production of the ferric chloride solution. It is preferred to use solutions of this kind in which 5 to 70 g. of ferric chloride has been dissolved in 100 ml. of solvent before the reduction.

Suitable solvents are those in which both ferric chloride and ferrous chloride are suitable, e.g., water-soluble solvents such as primary, secondary and tertiary aliphatic alcohols, for example methanol, ethanol, n-propanol, i-propanol and t-butanol, polyhydric alcohols, e.g., ethylene glycol and glycerol or carboxylic acid amides, for example formamide, dimethylformamide, N-methylpyrrolidone, or carboxylic acid nitriles, for example acetonitrile. It is however also possible to use solvents having but slight solubility in water, such as esters of lower aliphatic carboxylic acids, for example ethyl formate, methyl acetate, ethyl acetate, n-propyl acetate, methyl propionate and ethyl propionate.

Methanol has proved to be a particularly suitable solvent. Small amounts of water in the solvents used, for example in the alcohols, do not interfere with the course of the reaction. It is therefore not necessary to dry the solvents by expensive methods.

Reduction of the ferric chloride in the organic solvent proceeds within a wide temperature range; temperatures of between 0° and 200° C. are applied in practice. The reduction is advantageously carried out at the boiling temperature of the solvent used, for example at 65° to 70° C. when using methanol. The concentration of ferric chloride in the solvent may be varied within wide limits. It is advantageous however not to dilute the solutions too much. Since at room temperature, ferric chloride generally has better solubility than ferrous chloride in the solvent used (for example more than 50% by weight in methanol), the concentration of the starting solution should be adjusted according to the solubility of the ferrous chloride formed which is generally less. The concentration of the solutions is generally between 5% and 70%. In the case of methanol, 10 to 50%, preferably about 20 to 40% solutions of ferric chloride are used. It is advantages to slightly acidify the ferric chloride solutions prior to the reduction. Reduction usually then proceeds considerably more rapidly than when no acid has been added. Suitable acids are mineral acids, as for example hydrochloric acid, sulfuric acid, phosphoric acid, or organic acids, as for example formic acid, acetic acid, propionic acid, oxalic acid, in concentrations between $10^{-6}$ and 1 mole per liter, preferably between $10^{-4}$ and $10^{-2}$ mole per liter. The solutions of ferrous chloride thus obtained are reacted direct with strong organic bases. For example amines having a strong basic reaction such as diethylamine and piperidine and preferably the alcoholates of the alkali metals, especially of sodium, may be used; when an alcohol is used as solvent for ferric chloride, it is advantageous to use an alcoholate prepared from the alcohol used as solvent for the iron chlorides. The alcoholates of the alkali metals may be introduced in solid form, as alcoholic pastes or as concentrated alcoholic solutions, so that the high base concentration is achieved which is necessary for a good yield of ferrocene. It is not necessary to remove the solvent used by distillation before the base either in solid form or as a concentrated solution. 2 to 20 moles, particularly 2.5 to 10 moles, of the strong base may be added for each mole of ferrous chloride. It is advantageous to stir the mixture for about one to thirty minutes after the base has been added, before cyclopentadiene or an alkyl-substituted derivative thereof is introduced.

The reaction may be carried out at temperatures between 0° and 200° C., preferably at 20° to 70° C. Depending on the temperature and the reactivity of the hydrocarbon, the reaction is usually completed after one quarter to twenty hours and in the temperature range of 20° to 70° C. within one half to eight hours. It is advantageous to use the ferrous chloride in excess. In this way the valuable cyclopentadiene or cyclopentadiene derivative is used up almost completely for the formation of ferrocene. The ferrous chloride may be present in an excess of up to 20 moles per mole of cyclopentadiene or cyclopentadiene derivative. It is preferred to work with an excess of up to 1 mole of ferrous chloride per mole of cyclopentadiene or cyclopentadiene derivative.

Reduction of ferric chloride, reaction with the base and further reaction with cyclopentadiene or derivative thereof are all carried out with the exclusion of oxygen.

When a water-soluble solvent has been used, it is possible for working up the reaction mixture and separating the ferrocene, to allow the reaction mixture, which may contain not only ferrocene and solvent but also for example alkali metal chloride or the hydrochloride of the base, unreacted base, and residues of unreacted iron and ferrous chloride, to flow into a dilute aqueous mineral acid, particularly into dilute sulfuric acid. The volume of the aqueous mineral acid should advantageously be one half to ten times the volume of the reaction mixture. The concentration is advantageously regulated so that after the said reaction mixture has been added, an excess of acid remains. After the whole has been stirred for a short time, for example one to thirty minutes, all the byproducts pass into solution and the ferrocene separates from the acid solution and agglomerates to large flakes. Any blue coloration of the solution by oxidized ferrocene may be obviated by adding sodium dithionite. Further working up may be carried out in conventional fashion by filtration and washing with water, followed by drying. A degree of purity of the ferrocene of 95% and more is obtained.

When a solvent having only slight solubility in water has been used, however, it is possible to distill off the solvent and any volatile base present from the reaction mixture and to separate the pure ferrocene from the residue by sublimation, recrystallization (extraction) or steam distillation.

The process according to this invention makes possible the continuous industrial production of ferrocene using a unitary solvent which after the reaction is present for example in the form of an aqueous solution and can be recovered by a simple distillation, and iron in readily available form, i.e., technical iron powder and turnings, instead of high grade iron powder, as the reducing agent. Yields of 90% of the theory and more of pure ferrocene are obtained.

Ferrocene is a valuable material for catalyzing combustion processes. When added to fuel oils, it diminishes the formation of carbon black during combustion. Ferrocene is also a very effective antiknock agent when used as an additive to carburettor fuels or motor oils.

The following examples further illustrate the invention.

EXAMPLE 1

110 g. of ferric chloride is dissolved in 300 ml. of methanol in a 2-l. agitated flask fitted with a reflux condenser, thermometer, dropping funnel and protective gas inlet, and 20 g. of iron powder is added to the solution. The temperature is kept at about 65° C. for about twenty minutes. The whole is then cooled and 1000 ml. of 30% commercial sodium methylate solution is introduced. The reaction mixture is then stirred for about ten minutes at temperatures between 30° and 50° C. and then 132 g. of cyclopentadiene is added. Orange red particles of ferrocene are soon seen in the grey green mixture. Reaction is complete after three to four hours. The mixture is introduced into 4 liters of dilute sulfuric acid, stirred vigorously for about ten minutes, filtered and the residue washed thoroughly with water. After filtration, an orange yellow filter cake of ferrocene is obtained which after drying has a degree of purity of more than 90%. After recrystallization from toluene, 169 g. of pure ferrocene is obtained, equivalent to a yield of 91% of the theory.

EXAMPLE 2

120 g. of ferric chloride is dissolved in 300 ml. of methanol and 25 g. of iron powder is added as described in Example 1. After 5 ml. of methanolic hydrochloric acid (2 moles of HCl per mole of methanol) has been added, the reduction is complete within a few minutes, the methanol heating up to the boiling point. After the whole has been cooled to 50° C., 800 ml. of commercial sodium methylate solution is introduced. The whole is stirred until the temperature has fallen to 35° C. and then 132 g. of cyclopentadiene is introduced. Formation of ferrocene begins within a few minutes and can be detected by a change in color of the reaction mixture from grey green through yellow to orange; the temperature rises to about 45° C. The mixture is stirred for two hours and then introduced into 3 liters of dilute sulfuric acid. The ferrocene is filtered off after about fifteen minutes. After the product has been recrystallized from toluene, 172 g. of pure ferrocene is obtained, equivalent to a yield of 92.5% of the theory.

If 160 g. of methylcyclopentadiene be added instead of cyclopentadiene in a process which is otherwise the same and the whole is heated for six hours at the boiling point of methanol, 173 g. of pure dimethylferrocene having the melting point 33° C. is obtained, equivalent to a yield of 81% of the theory.

EXAMPLE 3

600 ml. of methanol is added in the reaction vessel described in Example 1 to 550 ml. of a ferrous chloride solution freshly reduced with iron turnings (236 g. of FeCl$_2$ per liter of solution). 270 g. of solid commercial sodium methylate is then introduced under an atmosphere of nitrogen. The mixture is stirred for half an hour and then 132 g. of cyclopentadiene is added. The mixture is then worked up as described in Example 2. 162 g. of pure ferrocene is obtained, equivalent to 87% of the theory.

EXAMPLE 4

For the continuous production of ferrocene, five reaction vessels fitted with stirrers are arranged consecutively in cascade. The whole assembly is under nitrogen as a protective gas. The first vessel is charged at the rate of 550 ml. per hour with a freshly reduced ferrous chloride solution (236 g./1.) At the same time 900 ml. of commercial sodium methylate (30% strength) flows in per hour.

The methanolic ferrous chloride solution is prepared continuously in a reaction tower by reduction of a methanolic ferric chloride solution with iron turnings and passes direct through a metering vessel into the first reaction vessel.

The mash formed flows over an overflow channel into the second reaction vessel to which 132 g. per hour of cyclopentadiene is added. The mash containing ferrocene flows in the same way through two more reaction vessels in which the mixture reacts to a conclusion with a mean residence period of 1.5 hours in each vessel. 3 liters per hour of dilute sulfuric acid is introduced into the fifth and last vessel. The acid dissolves the whole of the reaction mixture flowing in, with the exception of the ferrocene. The ferrocene is filtered off and dried. 158 to 182 g. of pure ferrocene is obtained per hour, equivalent to a yield of 85 to 98% of the theory.

EXAMPLE 5

5 ml. of methanolic hydrochloric acid (2 moles of HCl per liter of methanol) is added to a solution of 120 g. of ferric chloride in 250 ml. of methanol and the whole is then introduced through a dropping funnel into a 2-l. agitated flask, rinsed with nitrogen as protective gas, which contains a suspension of 25 g. of iron powder in 100 ml. of methanol which has been heated up to 60° C. Ferric chloride is immediately reduced to ferrous chloride as soon as it comes into contact with the metallic iron, in an exothermic reaction. The methanol is heated up in a short time to boiling point. Reaction heat can be withdrawn more quickly by means of a waterbath or icebath. Reduction can then be carried out completely within a few minutes.

Then 800 ml. of commercial 30% sodium methylate solution is added to the ferrous chloride solution, followed by 132 g. of monomeric cyclopentadiene at 40° C. Formation of ferrocene is practically completed after fifteen to twenty minutes. For recovery of the ferrocene, the reaction mixture is then immediately introduced into 2.5 liters of dilute sulfuric acid and further worked up as described in Example 1.

180 g. of pure ferrocene is obtained, equivalent to a yield of about 97% of the theory.

EXAMPLE 6

5 ml. of glacial acetic acid is added to a solution of 120 g. of ferric chloride in 250 ml. of methanol and the whole is further worked up as described in Example 5. The yield of pure ferrocene is 173 g. or 93% of the theory. Similar yields are obtained by using for example 5 ml. of concentrated sulfuric acid or 5 ml. of concentrated phosphoric acid instead of glacial acetic acid.

EXAMPLE 7

A solution of 120 g. of ferric chloride in 250 ml. of methanol is gassed with 5 g. of hydrogen chloride and then further worked up as in Example 5. The yield of ferrocene is 178 g. or 96% of the theory.

A tabulated summary of results obtained in other experiments is given in Table 1. The experiments were carried out as described in the foregoing examples and the solvent, acid added for reduction and base were varied.

*Table 1*

| Experiment No. | Solvent used | Acid for reduction | Base | Yield of ferrocene, percent |
|---|---|---|---|---|
| 8 | Ethanol | HCl | Sodium ethylate | 93 |
| 9 | do | CH³COOH | Sodium methylate | 94 |
| 10 | n-Propanol | HCl | Sodium n-propylate | 82 |
| 11 | do | $H_2SO_4$ | Sodium methylate | 87 |
| 12 | i-Propanol | HCl | do | 85 |
| 13 | t-Butanol | HCl | do | 80 |
| 14 | Glycol | HCl | do | 89 |
| 15 | Glycerol | HCl | do | 74 |
| 16 | Glycol mono methyl ether | HCl | do | 77 |
| 17 | n-Propanol | HCl | Diethylamine | 64 |

EXAMPLE 18

A solution of 120 g. of ferric chloride in 300 ml. of acetonitrile is treated for a short time with gaseous hydrogen chloride and then reacted with 20 g. of iron powder which has been suspended in 100 ml. of acetonitrile. A solution of ferrous chloride in acetonitrile forms within a short time. Then 800 ml. of sodium methylate solution (30%) is added to the solution followed by 132 g. of monomeric cyclopentadiene at 40° C. Formation of ferrocene is complete within ten to twenty minutes. The reaction mixture is introduced into 3 liters of dilute sulfuric acid and all the reactants with the exception of ferrocene are thereby dissolved. After the ferrocene has been filtered off and recrystallized, 176 g. of pure ferrocene is obtained, equivalent to a yield of almost 95% of the theory.

EXAMPLE 19

A solution of ferrous chloride in acetonitrile, prepared as described in Example 17, has 800 ml. of diethylamine added thereto and then 132 g. of monomeric cyclopentadiene is added at 40° C. After twenty minutes, the mixture is introduced into 3 liters of dilute sulfuric acid and the whole made weakly acid with further sulfuric acid. Further working up is carried out as described in Example 17. 128 g. of pure ferrocene is obtained, equivalent to a yield of 69% of the theory.

EXAMPLE 20

The volatile constituents are distilled off from a reaction mixture prepared as described in Example 19. Pure ferrocene is separated from the residue by sublimation, recrystallization (extraction) or steam distillation. From 125 to 150 g. of pure ferrocene is obtained, equivalent to a yield of 67% to 91% of the theory.

Other examples are given in the following Table 2, the procedure being as in the foregoing examples.

*Table 2*

| Experiment No. | Solvent used | Base used | Yield of ferrocene, percent |
|---|---|---|---|
| 21 | N-methylpyrrolidone | Sodium methylate | 96 |
| 22 | do | Diethylamine | 58 |
| 23 | Formamide | Sodium methylate | 84 |
| 24 | do | Diethylamine | 40 |
| 25 | Dimethylformamide | Sodium methylate | 99 |
| 26 | do | Diethylamine | 68 |
| 27 | do | Piperidine | 61 |
| 28 | Ethyl acetate | Sodium methylate | 94 |
| 29 | n-Butanol | do | 85 |

I claim:

1. A process for producing ferrocene compounds which comprises reducing ferric chloride dissolved in a solvent in which both ferric chloride and ferrous chloride are soluble to ferrous chloride with iron, said solvent being selected from the group consisting of saturated aliphatic, monohydric alcohols having 1–4 carbons, ethylene glycol, glycerol, formamide, lower alkyl-substituted formamide, N-lower alkyl-substituted pyrrolidone, acetonitrile, and esters of lower, saturated, aliphatic monocarboxylic acids and lower, saturated, monohydric alcohols, adding to the resulting solution a strong organic base, thereafter introducing into the reaction mixture a compound selected from the group consisting of cyclopentadiene and alkyl-substituted cyclopentadienes with one to four carbon atoms in the alkyl group, and thereafter separating the resultant ferrocene compound from the reaction mixture.

2. A process as claimed in claim 1 wherein said strong organic base is selected from the group consisting of an alkali metal alcoholate of a lower, aliphatic, monohydric alcohol piperidine, and diethylamine.

3. The process as claimed in claim 1 wherein said resultant ferrocene compound is separated from the reaction mixture by mixing the reaction mixture containing said ferrocene compound with a dilute, aqueous mineral acid at a ratio of one-half to ten parts by volume of the aqueous mineral acid per volume of the reaction mixture, and separating the ferrocene from the resultant mixture in the form of agglomerates.

4. A process for producing ferrocene compounds which comprises reducing ferric chloride dissolved in a saturated, aliphatic, monohydric alcohol having 1–4 carbons with iron to ferrous chloride, adding to the resultant solution a strong organic base, thereafter introducing into the reaction mixture a compound selected from the group consisting of cyclopentadiene and alkyl-substituted cyclopentadienes with one to four carbon atoms in the alkyl group and thereafter separating the resultant ferrocene compound from the reaction mixture.

5. A process as claimed in claim 4 wherein said strong organic base is an alkali metal alcoholate of the alcohol employed as the solvent for the ferric chloride and ferrous chloride.

6. A process as claimed in claim 1 wherein said solvent is formamide.

7. A process as claimed in claim 1 wherein said solvent is lower alkyl-substituted formamide.

8. A process as claimed in claim 1 wherein said solvent is a N-lower alkyl-substituted pyrrolidone.

9. A process as claimed in claim 1 wherein said solvent is acetonitrile.

10. A process as claimed in claim 1 wherein said solvent is an ester of a lower, saturated, aliphatic monocarboxylic acid and a lower, saturated, monohydric alcohol.

11. A process for the production of ferrocene compounds which comprises reducing ferric chloride dissolved in methanol with iron in an acid environment to ferric chloride, reacting the ferrous chloride in said solution with sodium methylate, combining the resultant reaction mixture with a compound selected from the group consisting of cyclopentadiene and alkyl-substituted cyclopentadienes with one to four carbon atoms in the alkylene group, and thereafter separating the resultant ferrocene compound from the reaction mixture.

12. A process as claimed in claim 11 wherein said acidic environment is provided by the mineral acid in a concentration between $10^{-6}$ and 1 mol per liter.

References Cited by the Examiner

UNITED STATES PATENTS 3,071,605  1/63  Morehouse _____ 260—439

FOREIGN PATENTS 211,085  10/57  Australia.

TOBIAS E. LEVOW, *Primary Examiner.*

UNITED STATES PATENT OFFICE
CERTIFICATE OF CORRECTION

Patent No. 3,217,022　　　　　　　　　　　　　November 9, 1965

Hans Cordes

It is hereby certified that error appears in the above numbered patent requiring correction and that the said Letters Patent should read as corrected below.

Column 2, line 41, for "advantages" read -- advantageous --; line 62, after "base" insert -- is added. Sodium methylate is particularly suitable --; column 3, line 49, for "reducting" read -- reducing --.

Signed and sealed this 18th day of October 1966.

(SEAL)
Attest:

ERNEST W. SWIDER
Attesting Officer

EDWARD J. BRENNER
Commissioner of Patents